United States Patent [19]

Behrens et al.

[11] Patent Number: 5,640,196

[45] Date of Patent: Jun. 17, 1997

[54] METHOD AND APPARATUS FOR FACILITATING TWO WAY ORAL COMMUNICATIONS UTILIZING A TELEVISION CABLE SYSTEM

[75] Inventors: Ralph W. Behrens, Glenview; Jonas Butvila, La Grange Park; James M. Williams, Lombard, all of Ill.

[73] Assignee: Motorola, Inc., Schaumburg, Ill.

[21] Appl. No.: 537,173

[22] Filed: Sep. 29, 1995

Related U.S. Application Data

[63] Continuation of Ser. No. 123,658, Sep. 20, 1993, abandoned.
[51] Int. Cl.$^6$ .................................................. H04M 11/00
[52] U.S. Cl. ............................ 348/14; 348/6; 348/12; 455/5.1; 455/6.3
[58] Field of Search ............................ 348/14, 13, 15, 348/16, 17, 18, 6, 7, 12; 455/3.1, 4.1, 4.2, 5.1, 6.1, 6.3

[56] References Cited

U.S. PATENT DOCUMENTS

| | | | |
|---|---|---|---|
| 4,491,983 | 1/1985 | Pinnow et al. | |
| 4,747,160 | 5/1988 | Bossard | |
| 5,027,426 | 6/1991 | Chiocca, Jr. | 348/14 |
| 5,040,177 | 8/1991 | Martin et al. | |
| 5,181,107 | 1/1993 | Rhoades | |
| 5,303,229 | 4/1994 | Withers et al. | 348/7 |
| 5,343,240 | 8/1994 | Yu | 348/14 |

FOREIGN PATENT DOCUMENTS

| | | |
|---|---|---|
| 0421602 | 4/1991 | European Pat. Off. |
| 0526285 | 2/1993 | European Pat. Off. |

OTHER PUBLICATIONS

Generic Criteria for Version 0.1 Wireless Access Communications Systems (WACS) published by Bellcore, 1993 (TR–INS–0011313), specifically Sections 6 and 7, among others.

Personal Access Communications System Air Interface Standard J–STD–014 (PACS) published by Technical Ad Hoc Group 3 of the T1/T1A Joint Technical Committee, specifically Sections 6 and 7, among others.

Langenberg, et al., "Integrating Entertainment and Voice on the Cable Network", Society of Cable Television Engineers, Conference on Emerging Technologies, Jan. 6–7, 1993.

*Primary Examiner*—Stella Woo
*Attorney, Agent, or Firm*—Jordan C. Powell

[57] ABSTRACT

Video and two-way telephone services are provided via a cable distribution network. Video signals and one group of trunked telephone channels are coupled in the forward direction to the cable distribution network. A second group of trunked telephone channels are extracted, in the reverse direction, from the cable distribution network.

10 Claims, 6 Drawing Sheets

METHOD AND APPARATUS FOR FACILITATING TWO WAY ORAL COMMUNICATIONS UTILIZING A TELEVISION CABLE SYSTEM

This is a continuation of application Ser. No. 08/123,658, filed Sep. 20, 1993 and now abandoned.

BACKGROUND OF THE INVENTION

This invention relates generally to communications utilizing television cable systems, and more particularly to methods and apparatus for facilitating two way oral communications utilizing television cable systems.

The availability of information services to the end user has steadily increased from two wire twisted pair telephone service through the delivery of interactive television services via a wide bandwidth port such as that offered via coaxial cable or fiber optic cable. It has become desirable to provide an economically viable physical plant for subscriber access to local telephone exchange and data service, using cable television transmission technology in combination with the channelization and signaling capabilities of a cellular-like radiotelephone technology.

Most residences and offices are connected to telephone service. Many residences and some offices are connected to a wide bandwidth cable service for the delivery of television programming. It is becoming more desirable to integrate at least these two services in a single wide bandwidth service which offers two-way communication.

Television cable systems are typically configured in a tree and branch arrangement or a hub and spoke arrangement in which many subscribers share a common branch or spoke. These networks are unlike a typical telephone network arrangement, which essentially provides an individual local loop to each subscriber. To increase the compatibility between cable distribution systems and telephone networks, it has been suggested that a segment of the spectrum carried via the cable distribution system be dedicated to a wireless telephone service. (See European Patent Application No. EP 0 421 602). As suggested, the wireless telephone service would simply displace some of the conventional cable services without integrating with the cable services for optimum spectrum utilization.

Radiotelephone services, such as cellular radiotelephone systems, provide efficient spectrum utilization by sharing the available channels among a large number of potential users by assigning radio channels and/or time slots on an as-needed basis. In addition to this user trunking of channels, the radio frequencies allocated to the channels are reused over a defined geographic area in a fashion designed to minimize interference.

The fact that radiotelephone subscribers move from place to place is a unique characteristic of this service and typically not seen in conventional land-line telephone service. A substantial amount of system control in a cellular radiotelephone system is dedicated to the accommodation of such subscriber mobility. Merely cloning a radiotelephone system in a cable distribution network, as previously suggested, is not the most efficient way of providing a two-way telephone service delivered via a cable network. Therefore, there is an unfulfilled need to provide an integrated cable television and trunked telephone service via a single two-way, wide bandwidth connection to the subscriber. This system should accomplish the service delivery in a manner which is spectrally efficient and cost effective.

DETAILED DESCRIPTION OF A PREFERRED EMBODIMENT

In order to realize an integrated cable television and trunked telephone service, the following preferred embodiment of the present invention is disclosed. Briefly, a Cable Network Service is an integration of cable television service, local telephone exchange service, and radiotelephone technology which yields benefits in efficiency and economics.

Cable Exchange Service provides for alternate, competitive, basic telephony services in local exchange areas, where permitted, or for alternate access to interexchange or other "special" telephony services such as data, ISDN or video phone service. The cable company is in a uniquely advantageous position to implement Cable Exchange Service because, in many cases, substantial cable plant is already in place and, in addition, the cable company is one of the few that has access to public fight-of-way.

Cable Exchange Service includes a "local loop" type of service in which an available and suitably constituted cable TV system is used to provide loop transport between a dedicated telephone switching office located at the cable company's office and suitable subscriber equipment located on the premises of the subscribers. In the preferred embodiment, the cable system and the facilities used to interface it to the telephone switch employ an appropriate interface technology analogous to the "Air Interface" used in shared wireless radiotelephone systems. The Cable Exchange Service of the preferred embodiment is uniquely adapted to co-exist in the cable plant with the traditional entertainment and information services of cable TV.

Figure 1:
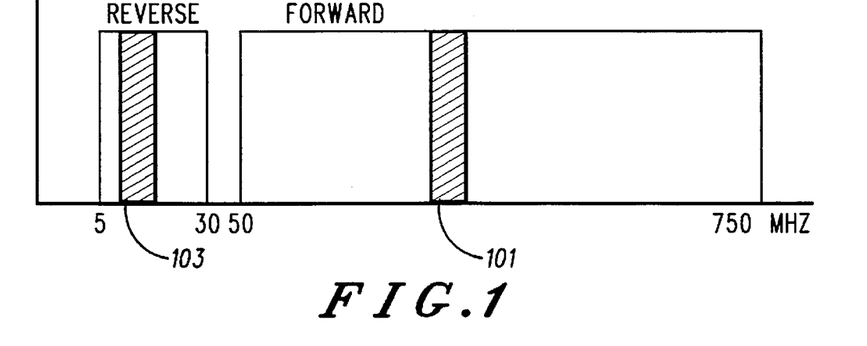
FIG. 1 is a chart illustrating the frequency spectrum which may be used in a cable distribution network.

Spectrum allocation in a typical cable television distribution network is shown in FIG. 1. In the forward, downstream, spectrum, a large number of conventional television channels (for example 120 channels) are conveyed to the cable television subscriber. In the reverse, upstream, spectrum, subscriber initiated service requests and other communication is allowed. In a network offering a Cable Exchange Service, a portion of the downstream spectrum, such as one or more television channels, and an equivalent in the upstream spectrum are dedicated to a plurality of trunked telephone traffic channels serving a large number of subscribers having two-way telephone service. It is an important feature of the present invention that the telephone service in the cable exchange service be a trunked service; that is, a cable radio frequency telephone traffic channel or time slot is not dedicated to one particular user but is available to all users on the basis of a request for service. Once a particular channel is assigned to a subscriber, it is assigned for the duration of the telephone call. When the call is terminated, the channel assignment to the subscriber is revoked and made available to another subscriber. This feature enables many more subscribers to have service than there are channels available. Furthermore, this trunking advantage is realized in every branch of the cable network since the radiotelephone channel availability is determined at the cable network headend or fixed site.

In the preferred embodiment, 6 MHz of spectrum 101 is allocated somewhere in the forward spectrum at the convenience of the Cable Exchange Service supplier, and 6 MHz of spectrum is allocated in the reverse spectrum 103. These allocations need not be spaced in frequency by a particular amount, but are integrated with the cable television services in such a way that interference between services are avoided. The 6 MHz of spectrum provides at least 140 telephone traffic channels accommodating approximately 1400 subscribers. Additional spectrum may be added to serve more subscribers.

Figure 2:
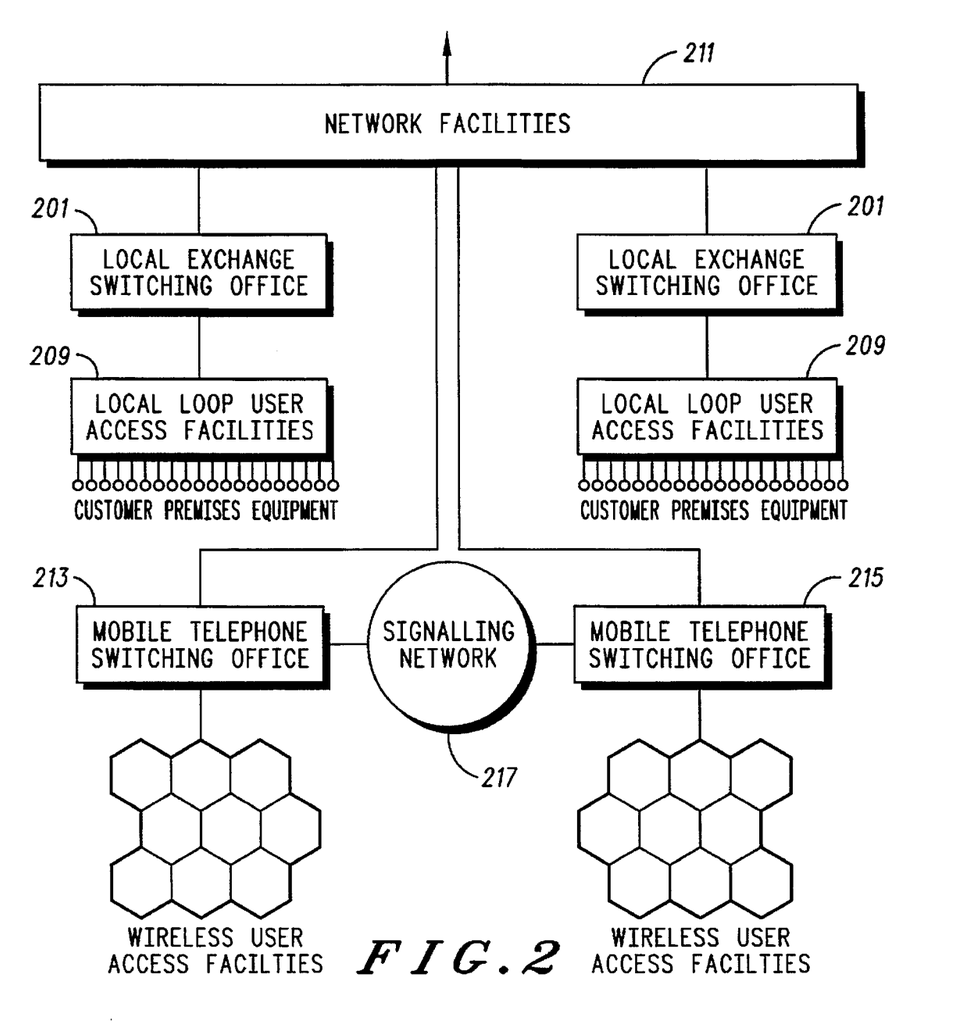
FIG. 2 is a block diagram illustrating a telephone network, including a mobile telephone switching office.

It is well recognized that conventional telephone exchange service allows customers to place telephone calls (which include voice or data message transmission) to other users located anywhere in the local calling area and to receive calls from users located anywhere in the world's interconnected telecommunications networks. It also allows access to other telecommunications services (e.g., interexchange and/or international services) so that the customer may also place calls to other users outside the local calling area. FIG. 2 shows an overview of the global Public Switched Telephone Network (PSTN) and the place of a local exchange network in it. All customer access to services is provided using the same Customer Premises Equipment (CPE), via local loop user access facilities 209 to the local exchange switching office 201. The local exchange network 201 provides access to the inter-exchange network, the international network, and other network facilities (considered, here, as block 211).

Each Local Exchange Switching Office (LESO) 201 is also interconnected with Customer Premises Equipment (CPE) by a variety of local loop user access facilities 209. These commonly include twisted copper wire pairs, optical fiber and microwave radio links. They facilities usually constitute the most expensive and difficult to maintain portion of a local exchange network. In addition, because they connect directly to customer equipment, the providers of loop access facilities may require access to public right-of-way for construction.

It can be seen that a radiotelephone service, such as a cellular radiotelephone service, provides essentially the same kinds of services as a telephone exchange service with the additional complication of dealing with the attribute of mobility on the part of the users. Although the basic services are the same, mobility causes the architecture of a mobile telephone exchange network to be substantially different from that of a local exchange network. FIG. 2 shows the relationship of the mobile telephone exchange network to other public telecommunications networks.

The Mobile Telephone Switching Offices (MTSOs) 213, 215 interconnect with the rest of the PSTN so that calls may be placed between mobile telephone subscribers and the fixed subscribers of the PSTN and so that connections can be established between MTSOs 213, 215 for mobile-to-mobile calls. Note also that they interconnect with each other by means of a common channel, inter-office signaling network 217. A great deal of interaction between MTSOs 213, 215 is expected and designed into a mobile telephone exchange network because of the mobility of the users.

Figure 3:
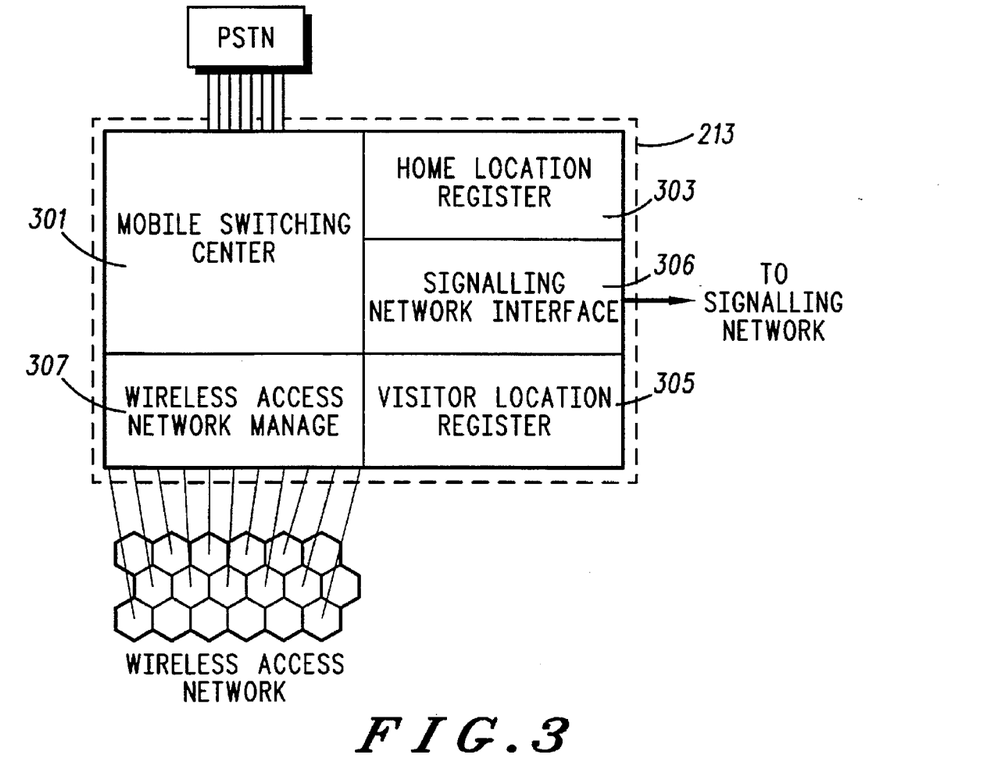
FIG. 3 is a block diagram of a mobile telephone switching office.

FIG. 3 shows the functional make-up of a MTSO (for example MTSO 213). The Mobile Switching Center (MSC) 301 provides basic call control and billing functions and manages the interfaces to the PSTN. The Home Location Register (HLR) 303 contains a permanent file of operating information for a specific group of subscribers, usually the customers of the service provider who owns the MTSO. The information includes the subscriber's terminal identity, authentication and encryption parameters, service profile and current location (serving system), and operating status. The Visitor Location Register (VLR) 305 maintains a temporary file of similar information for subscribers currently resident in the radio coverage area of the particular MTSO. MSCs, HLRs, and VLRs in different MTSOs are in more or less continual communication among themselves about various subscribers and their movements and activities. These communications are accomplished by means of the high performance signaling network 217 to which all participating MTSOs are connected via a signaling network interface 306 at each MTSO. A description of the signaling network requirements and the inter-system operations and messaging protocol may be found in EIA/TIA-IS-41-B Interim Standard, "Cellular Radio Telecommunications Intersystem Operations", December 1991.

In the wireless access network, multiple radio transceivers are deployed in a "cellular" arrangement, for example, to provide subscriber access in desired radio coverage areas. The wireless access network manager 307 controls the signalling protocols relating to the wireless access network. The equipment at each cell is permanently connected to the MTSO 213 by available transport facilities (twisted pair, optical fiber or microwave radio links). The "Air Interface" between the subscriber radiotelephone equipment and the cell site equipment specifies channelization, coding and modulation mechanisms. Frequently it is specified that transmissions from the cell site equipment to the subscriber equipment be done in one band of frequencies while those from the subscriber equipment to the cell sites be done at another coordinated band of frequencies. This is called Frequency Division Duplex (FDD) operation. Subscriber mobility requires that authenticated identification, validation, and service qualification be performed for each subscriber during every access made by the subscriber. The Air Interface also includes an elaborate signaling protocol to accommodate the mobility-related complexities of subscriber access such as cell to cell handover. Descriptions of representative "Air Interfaces" may be found in EIA/TIA-553 Standard, "Mobile Station—Land Station Compatibility Specification", September, 1989, and in TA-NWT-001313, "Generic Criteria for Version 0.1 Wireless Access Communication Systems (WACS)", Issue 1, July 1992 and Supplement 1, November, 1992, "Layers 2 and 3 Updates", the latter being the preferred embodiment for the Cable Exchange Service.

Figure 4:
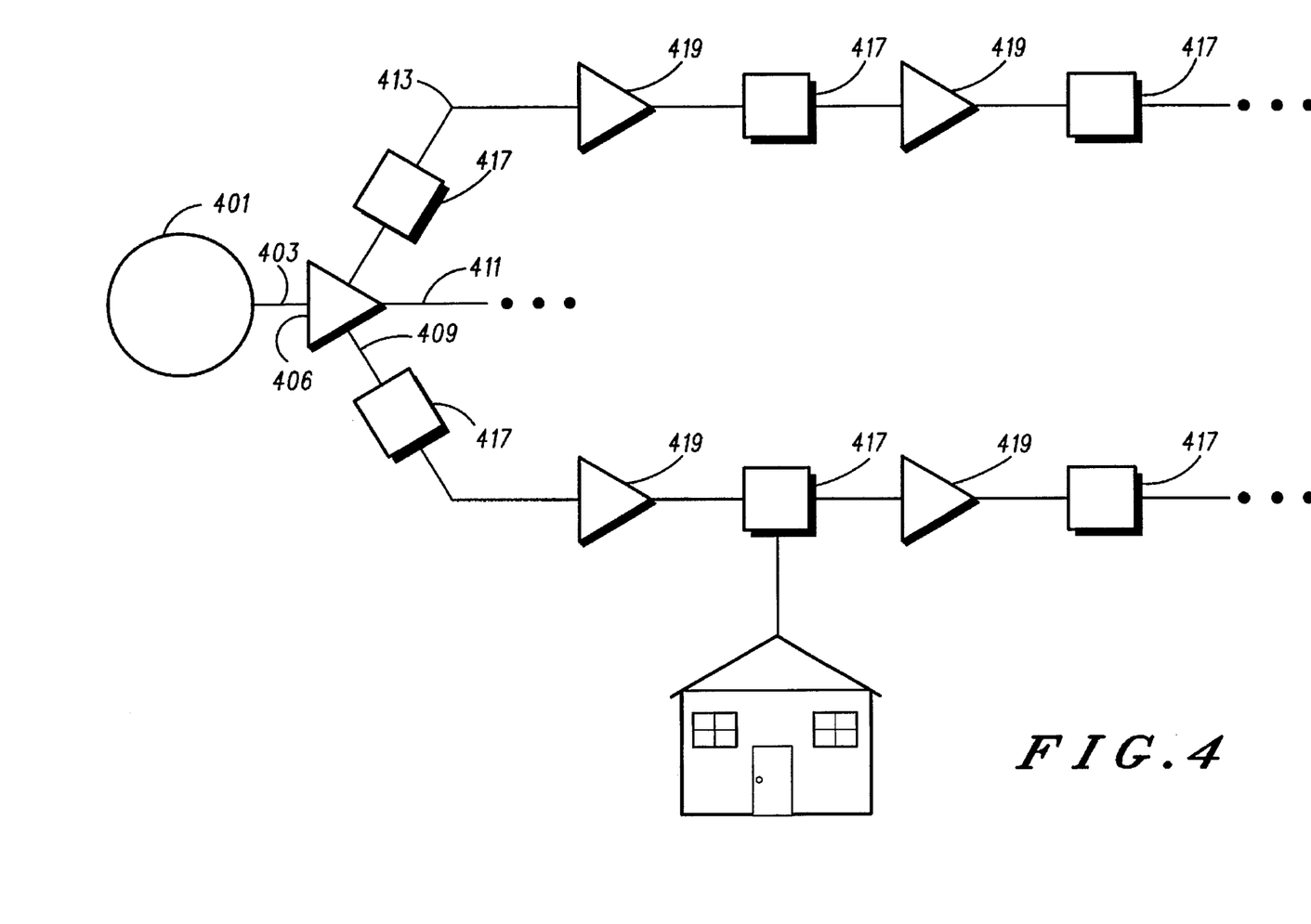
FIG. 4 is a block diagram of a cable distribution network.

Cable television service provides entertainment and information by broadcasting a set of 6 MHz TV signals from a central site, called a headend, to many subscribers throughout a community or area by means of a high performance transmission medium employing optical fiber and/or coaxial cable. FIG. 4 illustrates a common cable plant configuration. The headend 401 is coupled to the multitude of subscribers by means of coaxial cable or fiber optic cable. Typically, the backbone of the distribution system is realized using fiber 403 leading from the headend 401 to a fiber node converter 406 which provides a downconversion to the radio frequencies generally used in distribution cables 409, 411, and 413. It is expected that a cable distribution network of modest size will use several fiber optic cables extending from the headend to different fiber node converters to serve different segments of the cable service area. It is typical of a cable television service to use a tree and branch bussed topology for the cable 409, 411, 413 where multiple users are connected to the same physical line and have access to the same signal and line amplifiers 419 are placed along the cable to compensate losses along the cable. Drops to individual subscribers along the cable 409,411,413 are accomplished by taps 417. A cable television service is primarily designed to be a point to multipoint broadcast system with limited "upstream" capabilities. A typical system uses 50–750 MHz for television broadcasting and 5–30 MHz for upstream communication. In many systems in current use, the upstream path is used for premium service orders or remains inactive.

Figure 5:
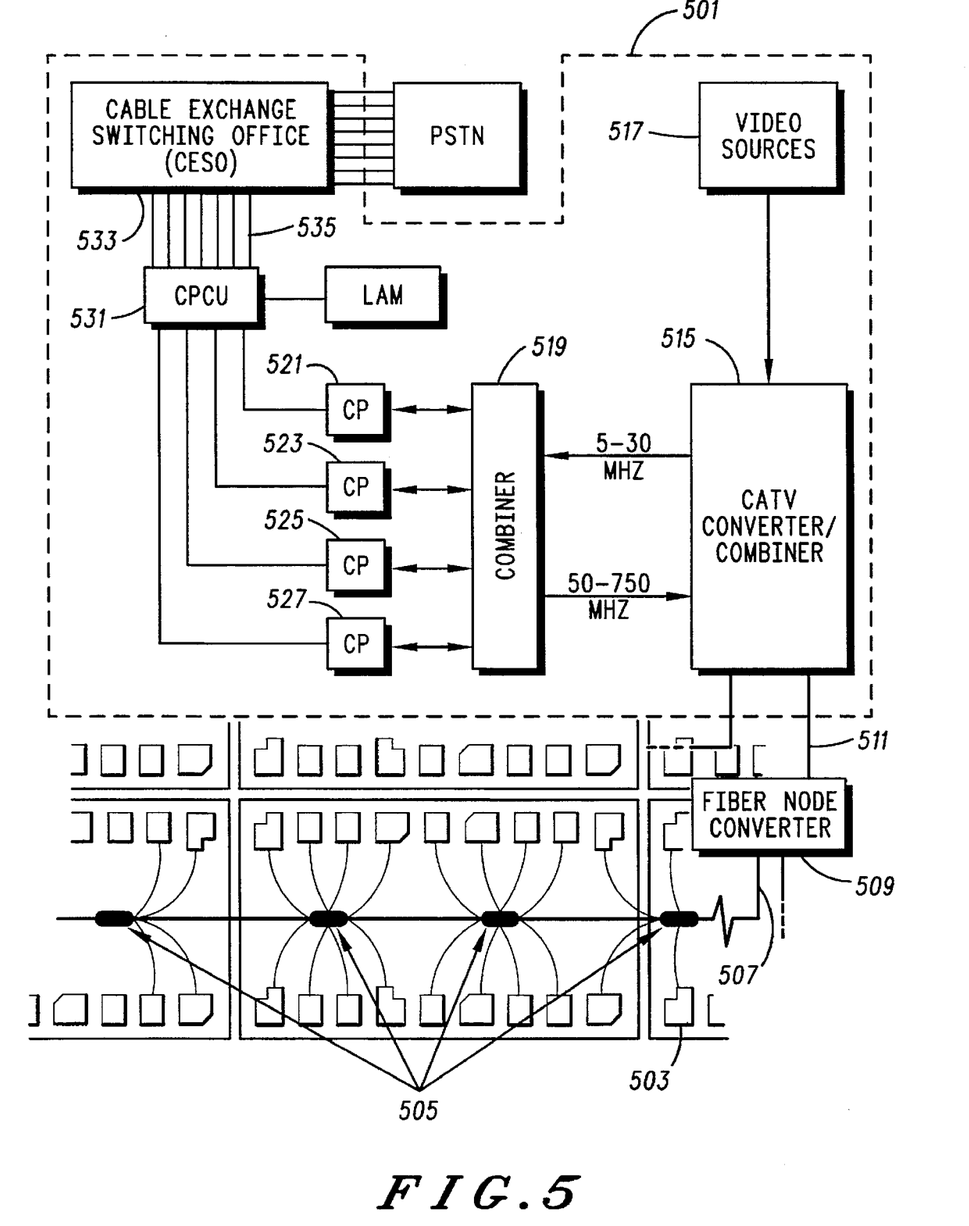
FIG. 5 is a block diagram of a Cable Exchange Service network which may employ the present invention.

A Cable Exchange Service system in the preferred embodiment of the present invention is illustrated in FIG. 5.

A central site 501 is conventionally coupled to many subscriber households (one of which is referenced as household 503) by way of taps (for example, 505) from a coaxial cable 507. The coaxial cable 507 is fed from fiber node converter 509 which is coupled by fiber optic cable 511 to the central site 501. There may be many groups of subscriber households, such as the one shown in FIG. 5, served by the same central site. Within a central site 501 of the preferred embodiment, one will find those components which provide both the conventional video signals expected in a cable television distribution network and cable telephone exchange components. The CATV converter/combiner 515 combines modulated carriers from the video sources 517 and telephone signals from the cable port combiner 519 without mutual interference by converting each to their proper locations in the cable spectrum. After the signals are combined they are applied to the optical fiber 511 for transmission through the fiber optic backbone.

The cable port combiner 519 is an arrangement, including a high pass filter and a summing amplifier, which adds together each of the downstream individual telephone channels which have been converted to a radio frequency by cable ports 521, 523, 525, and 527 in the selected band of frequencies between 50 and 750 MHz. The Cable Exchange Service operator determines the band of frequencies in a fashion which offers the least interference and the optimum use of the spectrum available in the bandwidth of the cable. It is a feature that the band of frequencies selected for use in the forward direction may be selected independently from the band of frequencies selected for the reverse direction. The implementation of the preferred embodiment readily accommodates this independent selection. The cable port combiner 519 couples the selected forward band of frequencies to the CATV converter/combiner 515. The cable port combiner 519 also receives the selected reverse band of frequencies located in the 5 to 30 MHz spectrum from the CATV converter/combiner 515 and distributes this band of frequencies to each of the cable ports 521, 523, 525, and 527. (Although four cable ports have been shown, any particular system will have more, fewer, or an equal number, as needed). Each cable port contains one or more digital transceivers, which are similar in many respects to those used in fixed service in the GSM (Groupe Speciale Mobile) radiotelephone system, and all necessary software for managing the channelization and protocol of the Air Interface described in the aforementioned TA-NWT-001313, "Generic Criteria for Version 0.1 Wireless Access Communication Systems (WACS)", Issue 1, July 1992 and Supplement 1, November, 1992, "Layers 2 and 3 Updates". It is a feature of the present invention that the frequency transmitted to the telephone subscriber be within the 50–750 MHz band while the frequency received from the telephone subscriber be within the 5–30 MHz band. The cable port interface interfaces directly to a cable port control unit (CPCU) 531 and, alternatively, may be integrated with it. Forward signals from the cable ports 521–527 are combined before injection into the cable system and reverse signals are split and delivered to the cable ports in the combiner 519.

The cable port control unit (CPCU) 531 provides interfaces to the cable ports 521–527 and to the standard subscriber loop facilities 535. In this respect, it is similar to a logical radio port control unit employed in the aforementioned GSM radiotelephone system. It also provides transcoding between the PCM of the cable exchange switching office (CESO) 533 and the voice coding scheme of the Air Interface physical channel structure, and multiplexing/de-multiplexing of telephone user traffic and the Air Interface signaling protocol.

The CPCU 531 also contains a small Time Slot Interchanger (TSI) to interconnect any time slot in the subscriber loop interface facilities 535 with another in the facilities feeding the cable ports 521–527.

The cable exchange switching office (CESO) 533 is a conventional telephone switching system designed to provide exchange services to fixed subscribers, such as an AT&T #5 ESS or an NTI DMS100. All primary and supplementary services are controlled and all billing information is assembled in the CESO 533.

In the preferred embodiment, each Cable Exchange Service subscriber requires a dedicated line appearance on the CESO 533. Digital subscriber loop carrier facilities 535 are used to connect the CPCU 531 to the CESO 533. The multiplexing and signaling format conforms to one of the major standards for Digital Subscriber Loop transport, for example, that specified in TR-TSY-000057, "Functional Criteria for Digital Loop Carrier Systems". Other examples are TR-TSY-000303, "Integrated Digital Loop Carrier System Generic Requirements, Objectives and Interface", Issue 1, September, 1986, plus Revision 1, December, 1987; Revision 2, July, 1989; Revision 3, March, 1990; Supplement 2, October, 1989 and Supplement 3, March 1990. Also, TA-TSY-000303, Issue 2, July, 1987 (Supplement 1 to the TA) and Revision 4, August, 1991. TR-TSY-000008, "Digital Interface Between the SLC®96 Digital Loop Carrier System and a Local Digital Switch", Issue 2, August 1987. ETSI prETS 300 324-1, "Signalling Protocols and Switching; V5.1 interface specification for the support of access network", March 1993. ETSI DE/SPS-3003.2, "Signalling Protocols and Switching, V Interfaces at the Digital Local Exchange; V5.2 Interface Specification for the Support of Access Network", Version 06, March 1993. (ETSI). For CESOs with integrated subscriber loop capabilities, the dedicated subscriber line appearances are virtual. With other CESOs, the subscriber lines could be physical appearances in the form of analog lines. These will require the use of a Central Office Terminal (COT; not shown in the diagram) to provide A/D conversion and to interconnect an available time slot in the subscriber loop interface facilities 535 to/from the CPCU 531 with any subscriber line appearance, as required.

Coupled to the CPCU 531 is a local access manager (LAM) 537. In some instances, the LAM may be integrated with the CPCU, but is discussed here as a separate functional element in the reference architecture. The LAM 537 terminates the signaling channel(s) of the subscriber loop interface facilities 535 and those of the Air Interface multiplex/demultiplex by the CPCU, and performs all necessary protocol conversions. It provides the logic to control the alerting, access, authentication and encryption processes on the Air Interface, to correlate a Subscriber Terminal Identity with the appropriate subscriber line appearance and to manage time slot interconnections via the TSIs in the CPCU 531. The LAM maintains a Permanent Subscriber Information Store (PSIS), indexed by both the Subscriber Terminal Id and the subscriber line Id, which contains all information required for managing the access operations of subscribers served by cable ports 521–527 attached to the CPCU 531.

Figure 6:
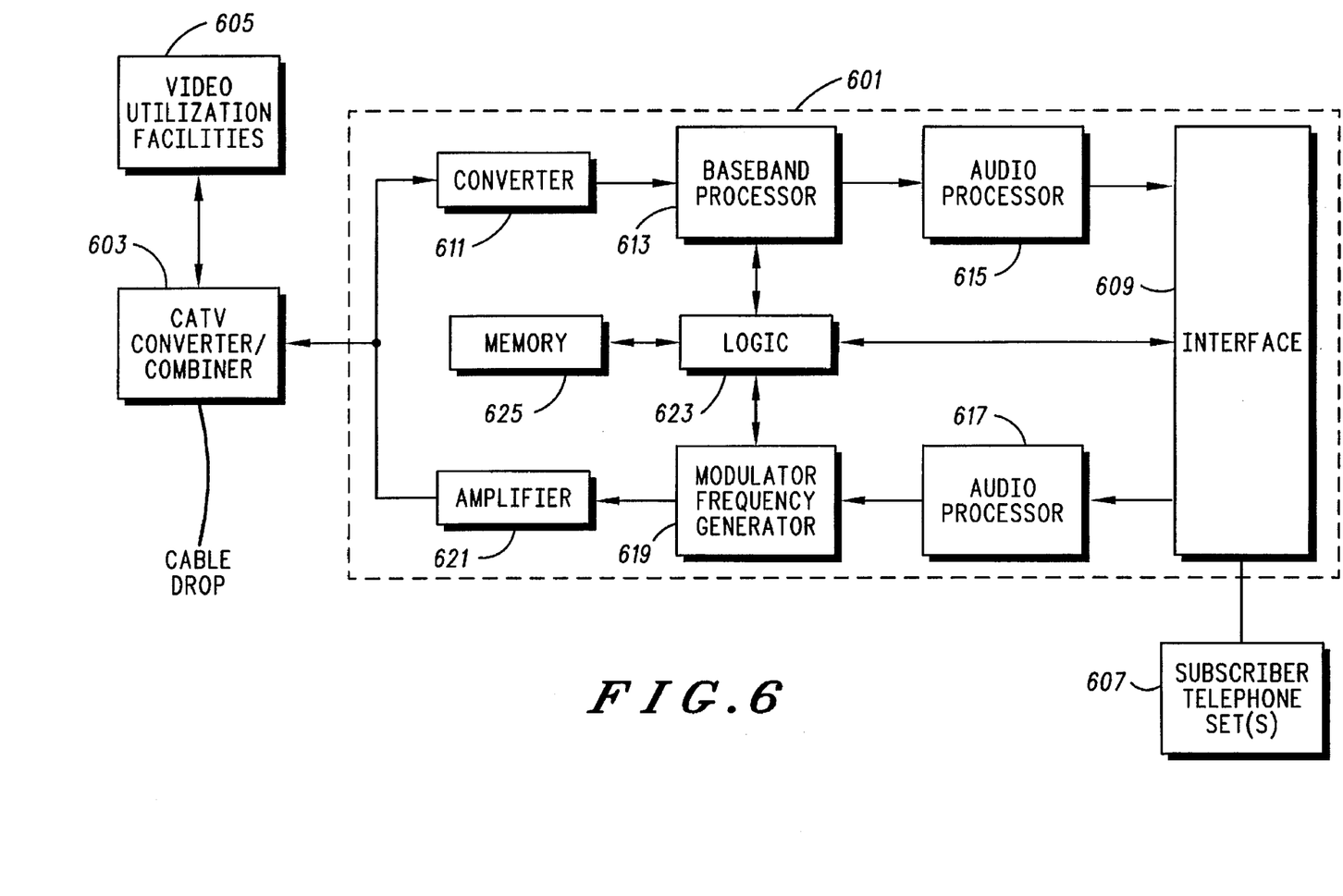
FIG. 6 is a block diagram of a cable fixed access unit which may be employed in the present invention.

A cable fixed access unit (CFAU) is physically located at the subscriber's premises, for example at the subscriber's home. A CFAU, which may be employed in the preferred embodiment, is shown in FIG. 6. The CFAU 601 is coupled to the cable drop via a CATV converter/combiner 603. The CATV converter/combiner 603 provides cable drop impedance matching and supplies the band of frequencies normally occupied by television video signals to a video utilization facility 605. Typically, a video utilization facility 605 is a television receiving set or a VCR, but may also comprise a two-way device for communicating a video user's selection of video services. Removed from the band of frequencies supplied to the video utilization facilities 605, is a sub-band of frequencies coupled to the CFAU 601. This sub-band corresponds to the frequencies occupied by the frequencies used by the cable port devices 521–527 in the central site 501. In effect, a sub-band of frequencies in the 50–750 MHz band is coupled to the receiver of CFAU 601 and eliminated from the frequencies supplied the video utilization facilities 605. Also, a sub-band of frequencies in the 5–30 MHz band is accepted from the transmitter of the CFAU 601 and rejected from the video utilization facilities 605 by CATV converter/combiner 603 Communication interface with the central site 501 is realized using the Air Interface referenced above. The CFAU 601 is equipped with an interface 609 supporting connection to a standard wire-line telephone set 607. All supervisory and address signaling is provided and appropriate electrical levels are maintained at this interface 609. Signals coupled from the CATV converter/combiner 603 are routed to the frequency converter 611 which down-converts the radio frequency to a frequency at which the modulation (impressed upon the radio frequency by the cable port) may be extracted by the baseband processor 613. The resulting information is filtered, amplified, and otherwise prepared to be presented to the interface 609 and subscriber telephone set 607. Message signals generated by the subscriber telephone set 607 are coupled through the interface 609 to an audio processor 617 for amplification, filtering, and conversion to proper format for application to the modulator of the frequency generator/modulator 619. The modulated radio signal of the proper frequency is applied to amplifier 621 for coupling to the CATV converter/combiner 603. Control of the CFAU 601 is exercised by the logic function 623 employing a memory 625.

The following items of information are maintained in the memory 625 of each CFAU terminal: SU ID (subscriber unit (terminal) identity, which is programmed into the CFAU off-line); AUTH ID (authentication identity used in verifying the CFAU's identity, programmed into the CFAU off-line); CPHR KEY (private session key to be provided by the CFAU with each service request access and used to encipher all RF transmissions beyond the initial access message, programmed into the CFAU off-line); SERVICE PROVIDER ID (identity of the Service Provider in whose service area the CFAU is currently registered and supplied by the LAM as "System Information"); ALERT PHASE (portion of the alerting super-frame during which the CFAU's alerts will be transmitted and which is assigned by the LAM at registration. This field is always null when the CFAU is not in-service); ALERT ID (temporary identity, assigned by the LAM at registration, and used by the system to initiate contact with the CFAU. This field is always null when the CFAU is not in-service); and CALL ID (Radio Call Identifier assigned by the serving LAM for each call-related access by a CFAU; null except during a call-related access).

Each Cable Exchange Service subscriber must have an entry in the PSIS (Permanent Subscriber Information Store) of the LAM controlling the subscriber's dedicated line appearance. It can be understood, then, that the LAM correlated the dedicated line appearance to the Air Interface identity of the particular subscriber CFAU. PSIS entries are created by administrative action and, at a minimum, includes the following items of information: LINE ID (internal identity of the subscriber's dedicated line appearance on the local exchange); SU ID (subscriber unit (CFAU) identity); AUTH ID (authentication identity used in verifying the terminal unit's identity); ALERT AREA (identity of a group of Cable Ports that are defined as constituting an alerting (or registration) group); ALERT PHASE (portion of the alerting super-frame during which a CFAU's alerts will be transmitted and assigned by the LAM at registration, de-assigned at power down. This field is always null when the CFAU is not in-service); ALERT ID (temporary identity, assigned by the LAM at registration, and used by the system to initiate contact with a CFAU and de-assigned at power down. This field is always null when the CFAU is not in-service); CALL ID (Radio Call Identifier assigned by the serving LAM for each call-related access by a CFAU. Null except during a call-related access); and CPHR KEY (private session key, provided by the terminal with each service request access, and used to encipher all radio frequency transmissions beyond the initial access message; null except during an access).

In the preferred embodiment, Cable Exchange Service is limited to fixed access only thereby eliminating need for the complexities of handover which are associated with system control of cellular-type systems. CFAUs use an analogous "Air Interface" logic when accessing the Cable Exchange Service. The "Air Interface" specifies procedures whereby a CFAU: (a) determines whether or not a usable signal is available on the cable drop; (b) selects a suitable cable port to serve as its current network access point; and (c) decides whether or not a registration transaction with the network is necessary subsequent to cable port selection.

These procedures are performed whenever the CFAU is powered up and continuously (or, in an alternate embodiment, periodically) for as long as the terminal remains turned on. To facilitate these procedures, one of the radio frequency channels continuously transmits a System Broadcast Channel (SBC) using a particular time slot on one of its assigned carrier frequencies. Two logical channels—the System Information Channel (SIC) and the Alerting Channel (AC)—are generated by the LAM 537 and multiplexed onto the SBC by the serving cable port. Remaining time slots are used for subscriber traffic. The SIC includes any information required by terminals to perform the above procedures. Further, a CFAU, at normal power down, will inform the network that it is about to go out-of-service.

Collectively, these procedures address the issues of system acquisition, registration, sign-in and sign-out.

Registration is the process by which the Cable Exchange Network lists a CFAU as being present at a particular location within the network. It involves an Air Interface transaction between the CFAU and its Cable Access Network at which time the CFAU's identity is authenticated and an alerting identity is assigned. Strictly speaking, registration only occurs when the CFAU selects a Radio Port that is transmitting a System Id. In the Cable Exchange system of the preferred embodiment, service initialization is the only time registration occurs.

Sign-in/sign-out is the process by which the Cable Exchange Network keeps track of the current operating status—in service or out-of-service—of a CFAU. This process also involves Air Interface transactions between the CFAU and the serving wireless access network. Registration clearly implies sign-in—the CFAU must be in-service to conduct the transaction. Sign-in requires the assignment of a new alerting identity. Sign-in, strictly speaking, only occurs when the CFAU powers up and selects a serving Cable Port at which the System Broadcast Channel carries the same System Id and the same Alert Area Id for which the CFAU last registered. In the preferred embodiment, sign-in normally occurs only in recovering from power failures and similar service outages. Sign-out, strictly speaking, only occurs when the CFAU powers down. The LAM 537 releases the CFAU's current alerting identity whenever sign-out occurs. As in sign-in, sign-out will occur only after a power failure and similar service outages. The same Air Interface "message" is used for all of the above operations with a parameter indicating the particular usage, e.g., "0" sign-out; "1" initial registration (new alerting area); and "2" sign-in (same alerting are as at sign-out).

The LAM 537 in the cable access network maintains one or more traffic channels that are "marked" with a known bit pattern indicating "Idle and Available". All system accesses follow the same general procedure in which the first byte of the initial access message, indicating the nature of the access, is transmitted in the clear. The remainder of the message includes the Terminal Id, the Authentication Id, and the CFAU's private Cipher Key to be used as the session key for the remainder of the access. This information is encrypted using the Public Key supplied by the network in the system information channel or by other means.

Figure 7:
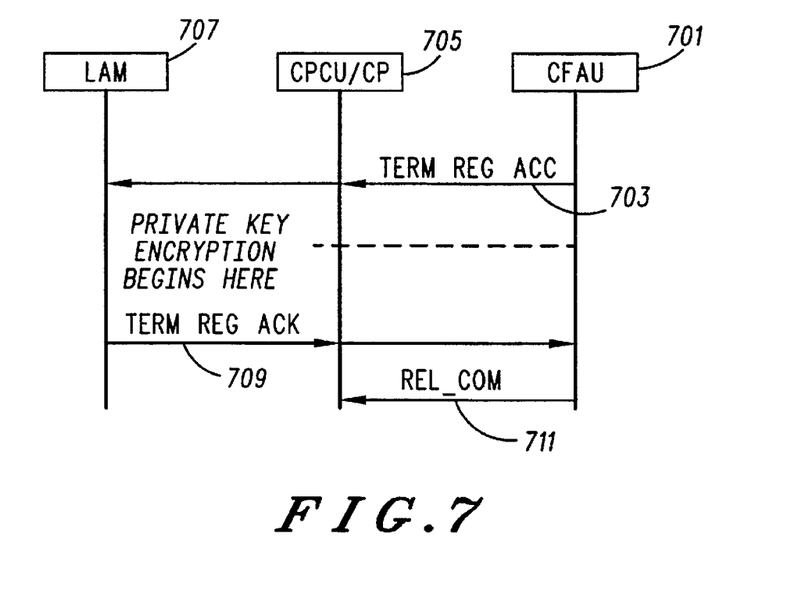
FIG. 7 is a timing diagram of the process of cable fixed access unit registration with the Cable Exchange Service network such as that which may be employed in the present invention.

The timing diagram of FIG. 7 illustrates registration by the CFAU with its cable access network. The CFAU 701 uses a digital correlation process to acquire frame sync with a "marked idle" time slot and then transmits a Terminal Registration Access (TERM REG ACC) 703 message to the CPCU/CP 705 on the selected traffic channel. This message contains a REGISTRATION TYPE parameter (set to 1) and the CFAU's identity (SU ID). The LAM 707 recognizes the CFAU 701 as a subscriber of the access network because the LAM 707 has an entry in the PSIS. It authenticates the CFAU's identity, assigns an Alert Phase and an Alert Id and sends a Terminal Registration Acknowledge (TERM_REG_ACK) 709 message to the CFAU 701 via CPCU/CP 705. This message contains the alerting information which the CFAU uses to monitor the Alerting Channel for incoming calls. The CFAU 701 updates its relevant internal memory and sends a Release Complete (REL_COM) message 711 to the CPCU 705, releasing the radio link. (The process described above is identical for a sign-in registration except that, the REGISTRATION TYPE parameter is set to 2 instead of 1.) In the initial registration scenarios, if the terminal does not have an entry in the PSIS, the LAM 707 will still send a TERM_REG_ACK message to the requesting CFAU but with a "dummy" Alert Phase and Alert Id. This CFAU will be unable to receive any incoming calls and any call origination attempts may be routed to an operator for credit card treatment.

Unlike portable radiotelephone subscriber units currently in use in cellular radiotelephone systems, the CFAU connects with a standard wireline telephone set which, in the preferred embodiment, has no display and no "send" button. The CFAU emulates, to the subscriber, a wire connection to the CESO 533. Although a number of variations are possible, the preferred embodiment utilizes the following dialing procedure diagrammed in FIG. 8. The subscriber lifts the handset off-hook and the CFAU 801 uses a digital correlation process to acquire frame sync with a "marked idle" time slot and then transmits a Call Request Access (CALL REQ ACC) 803 message to the LAM/CPCU/CP 805 on the selected traffic channel. The called party number field contains no dialed digits. The LAM/CPCU/CP 805 initiates an OUTCALL procedure 807 in which "OFF-HOOK" is indicated to the CESO 809 for the subscriber's dedicated line appearance in the subscriber loop facilities 535. The CESO 809 provides dial tone on the traffic channel to the subscriber. The LAM directs the CPCU to establish a connection between the CESO 809 interface channel and the cable traffic channel and sends a CONNECT message 811 to the CFAU 801 which begins voice decoding so that the subscriber may hear dial tone from the CESO 809. The subscriber proceeds with dialing. The CFAU detects and sends each successive digit to the LAM/CPCU/CP 805 by means of USER INFO-DIGIT messages 813. The LAM/CPCU/CP 805 outpulses each received digit to the CESO 809. When the CESO 809 determines end-of-dialing, it routes the call to its destination through the PSTN.

The origination phase is now complete from the access network's point of view. The PSTN completes its processing and, if the called party answers, conversation ensues.

Figure 8:
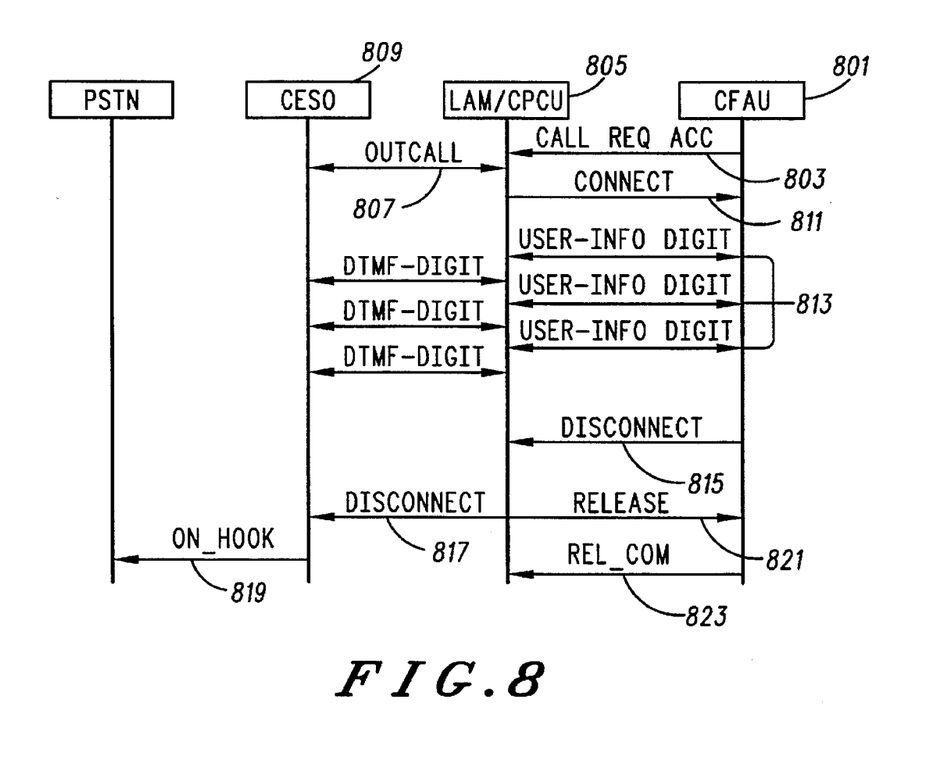
FIG. 8 is a timing diagram of the dialing process which may be employed in the present invention.

When the subscriber ends the call, the CFAU 801 sends a DISCONNECT message 815 to the LAM/CPCU/CP 805. The LAM/CPCU/CP 805 sends a DISCONNECT message 817 to the CESO 809. The CESO 809 indicates ON-HOOK 819 to the PSTN. The LAM/CPCU/CP 805 sends a RELEASE message 821 to the CFAU 801. The CFAU 801 sends a REL_COM message 823 to the LAM/CPCU/CP 805 which returns the radio channel to idle.

Figure 9:
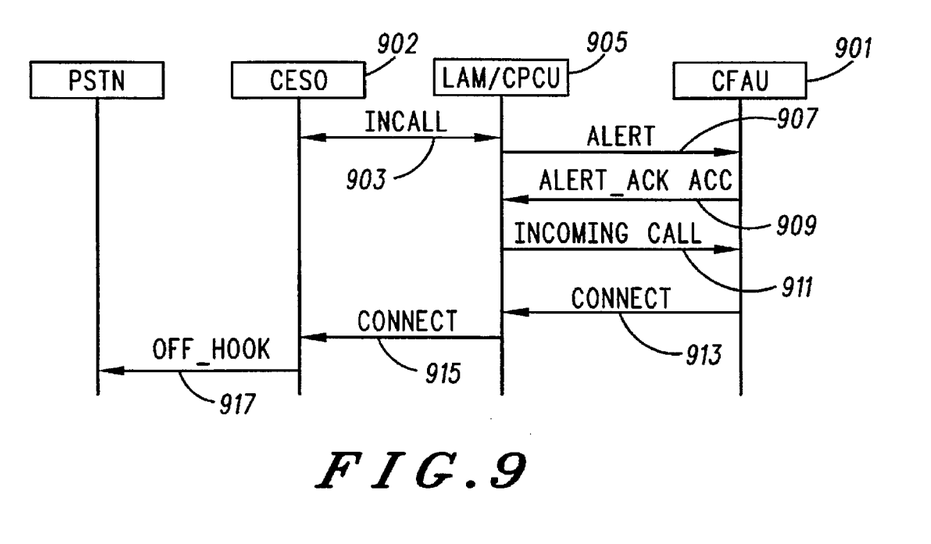
FIG. 9 is a timing diagram for an incoming call to the cable fixed access unit which may be employed in the present invention.

FIG. 9 illustrates the procedure for an incoming call terminated by a CFAU 901 via the cable access network. When the PSTN delivers an incoming call to the CESO 902. The CESO 902 initiates an INCALL procedure 903, via the dedicated line appearance of the subscriber in the subscriber loop facilities 535. Thereby, the LAM/CPCU/CP 905 is informed of the incoming call and the line id, and a connection is established to the LAM/CPCU/CP 905. The LAM/CPCU/CP 905 finds the subscriber's entry in the PSIS, determines that the CFAU 901 is currently in-service and initiates the alerting process using the CFAU's current Alert Area, Alert Phase, and Alert Id in an alert message 907. When the CFAU 901 receives the alert message 907, it uses a digital correlation process to acquire frame sync with a "marked idle" time slot and then transmits an ALERT_ACK_ACC message 909 to the LAM/CPCU/CP 905 on the selected traffic channel. The LAM/CPCU/CP 905 sends an INCOMING_CALL message 911 to the CFAU 901. (This message contains calling and called party numbers if available from the PSTN; if not, the corresponding message fields will be null). When the subscriber answers, the CFAU 901 sends a CONNECT message 913 to the LAM/CPCU/CP 905. The LAM/CPCU/CP 905 sends a CONNECT message 915 to the CESO 902. The CESO 902 indicates OFF-HOOK 917 to the PSTN and conversation may ensue.

We claim:

1. A method for facilitating a two way communication utilizing a cable television system comprising the steps of:

registering a cable fixed access unit residing at a location within the cable television system following initial installation at the location, by carrying out the steps of:

the cable fixed access unit synchronizing with a particular communication time slot in a selected traffic channel;

the cable fixed access unit transmitting to a local access manager a request registration message in the communication time slot of the selected traffic channel;

in response to receiving the request registration message, the local access manager transmitting to the cable fixed access unit an alert phase indicative of a portion of a time frame when an alert directed to the cable fixed access unit may be transmitted, and an alert ID;

in response to the local access manager transmitting the alert phase and the alert ID, the cable fixed access unit storing the alert phase and alert ID in an internal memory; and the cable fixed access unit transmitting on the selected traffic channel a release complete message causing the selected traffic channel to be released.

2. The method of claim 1, wherein the step of synchronizing with the particular communication time slot comprises employing a digital correlation process to acquire a frame synchronization.

3. The method of claim 1, wherein the step of transmitting to the local access manager the request registration message comprises transmitting a subscriber ID identifying the cable fixed access unit to the local access manager.

4. The method of claim 3, further comprising the step of the local access manager authenticating the cable fixed access unit by correlating the subscriber ID with information stored in a subscriber database.

5. The method of claim 4, further comprising the step of providing a dummy alert phase and a dummy alert ID in response to a failed authentication.

6. A method for facilitating a two way communication utilizing a cable television system comprising the steps of:

signing in a cable fixed access unit residing at a location within the cable television system following a service outage, by carrying out the steps of:

the cable fixed access unit synchronizing with a particular communication time slot on a selected traffic channel;

the cable fixed access unit transmitting to a local access manager a request sign-in message in the communication time slot of the selected traffic channel;

in response to receiving the request sign-in message, the local access manager transmitting to the cable fixed access unit an alert phase indicative of a portion of a time frame when an alert directed to the cable fixed access unit may be transmitted, and an alert ID;

in response to the local access manager transmitting the alert phase and the alert ID, the cable fixed access unit storing the alert phase and alert ID in an internal memory; and the cable fixed access unit transmitting on the selected traffic channel a release complete message causing the selected traffic channel to be released.

7. The method of claim 6, wherein the step of synchronizing with the particular communication time slot comprises employing a digital correlation process to acquire a frame synchronization.

8. The method of claim 6, wherein the step of transmitting to the local access manager the request sign-in message comprises transmitting a subscriber ID identifying the cable fixed access unit to the local access manager.

9. The method of claim 8, further comprising the step of the local access manager authenticating the cable fixed access unit by correlating the subscriber ID with information stored in a subscriber database.

10. The method of claim 9, further comprising the step of providing a dummy alert phase and a dummy alert ID in response to a failed authentication.

* * * * *